(12) United States Patent
Zewail et al.

(10) Patent No.: US 12,526,092 B2
(45) Date of Patent: Jan. 13, 2026

(54) HYBRID AUTOMATIC REPEAT REQUEST ACKNOWLEDGEMENT CODEBOOK FOR DOWNLINK CONTROL INFORMATION WITHOUT DOWNLINK ASSIGNMENT

(71) Applicant: QUALCOMM Incorporated, San Diego, CA (US)

(72) Inventors: Ahmed Abdelaziz Ibrahim Abdelaziz Zewail, San Diego, CA (US); Yan Zhou, San Diego, CA (US); Jing Sun, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 552 days.

(21) Appl. No.: 18/057,059

(22) Filed: Nov. 18, 2022

(65) Prior Publication Data

US 2023/0208566 A1    Jun. 29, 2023

Related U.S. Application Data

(60) Provisional application No. 63/266,132, filed on Dec. 29, 2021.

(51) Int. Cl.
*H04L 1/1829* (2023.01)
*H04B 7/06* (2006.01)
*H04L 1/1812* (2023.01)
*H04L 5/00* (2006.01)

(52) U.S. Cl.
CPC ......... *H04L 1/1861* (2013.01); *H04B 7/0639* (2013.01); *H04L 5/0055* (2013.01); *H04L 1/1812* (2013.01)

(58) Field of Classification Search
CPC ... H04L 1/1861; H04L 1/1812; H04L 5/0055; H04B 7/0639
See application file for complete search history.

(56) References Cited

U.S. PATENT DOCUMENTS

| | | | |
|---|---|---|---|
| 2021/0105102 A1* | 4/2021 | Li | H04L 1/1896 |
| 2022/0061077 A1* | 2/2022 | Choi | H04W 24/08 |
| 2022/0303979 A1* | 9/2022 | Li | H04L 5/0055 |
| 2022/0394548 A1* | 12/2022 | Huang | H04W 72/23 |
| 2023/0090424 A1* | 3/2023 | Chung | H04L 1/1671 |
| | | | 370/329 |
| 2024/0089943 A1* | 3/2024 | Yu | H04L 5/0055 |

(Continued)

OTHER PUBLICATIONS

International Search Report and Written Opinion—PCT/US2022/080227—ISA/EPO—Mar. 16, 2023.

(Continued)

*Primary Examiner* — Redentor Pasia
(74) *Attorney, Agent, or Firm* — Harrity & Harrity, LLP \ Qualcomm

(57) ABSTRACT

Various aspects of the present disclosure generally relate to wireless communication. In some aspects, a user equipment (UE) may receive, from a network node, downlink control information (DCI) not associated with a downlink assignment. The UE may transmit, to the network node, an acknowledgement (ACK) or negative acknowledgement (NACK) bit for the DCI not associated with the downlink assignment in a first sub-codebook of a hybrid automatic repeat request (HARQ)-ACK codebook. Numerous other aspects are described.

30 Claims, 8 Drawing Sheets

(56) References Cited

U.S. PATENT DOCUMENTS

2024/0283575 A1* 8/2024 Zhang .................. H04W 72/23
2024/0322979 A1* 9/2024 Marinier ............... H04L 1/1861

OTHER PUBLICATIONS

MCC Support: "Final Report of 3GPP TSG RAN WG1 #104bis-e v1.0.0 (Online meeting, Apr. 12-20, 2021)", 3GPP TSG RAN WG1 Meeting #105-e, R1-2104151, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, May 17, 2021, XP052010663, pp. 1-141, pp. 45,49,51.

Moderator (LG Electronics): "Summary #4 of PDSCH/PUSCH enhancements (Scheduling/HARQ)", 3GPP TSG RAN WG1 #104b-e, R1-2104104, 3rd Generation Partnership Project, Mobile Competence Centre, 650, Route Des Lucioles, F-06921 Sophia-Antipolis Cedex, France , vol. RAN WG1, No. e-Meeting, Apr. 12, 2021-Apr. 20, 2021, Apr. 21, 2021, XP051997559, 86 pages, pp. 43,45.

* cited by examiner

HYBRID AUTOMATIC REPEAT REQUEST ACKNOWLEDGEMENT CODEBOOK FOR DOWNLINK CONTROL INFORMATION WITHOUT DOWNLINK ASSIGNMENT

CROSS-REFERENCE TO RELATED APPLICATION

This Patent Application claims priority to U.S. Provisional Patent Application No. 63/266,132, filed on Dec. 29, 2021, entitled "HYBRID AUTOMATIC REPEAT REQUEST ACKNOWLEDGEMENT CODEBOOK FOR DOWNLINK CONTROL INFORMATION WITHOUT DOWNLINK ASSIGNMENT," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for a hybrid automatic repeat request acknowledgement (HARQ-ACK) codebook for downlink control information (DCI) without downlink assignment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: receive, from a network node, downlink control information (DCI) not associated with a downlink assignment; and transmit, to the network node, an acknowledgement (ACK) or negative acknowledgement (NACK) bit for the DCI not associated with the downlink assignment in a first sub-codebook of a hybrid automatic repeat request (HARQ)-ACK codebook.

In some implementations, an apparatus for wireless communication at a network node includes a memory and one or more processors, coupled to the memory, configured to: transmit, to a UE, DCI not associated with a downlink assignment; and receive, from the UE, an ACK or NACK bit for the DCI not associated with the downlink assignment in a first sub-codebook of a HARQ-ACK codebook.

In some implementations, a method of wireless communication performed by a UE includes receiving, from a network node, DCI not associated with a downlink assignment; and transmitting, to the network node, an ACK or NACK bit for the DCI not associated with the downlink assignment in a first sub-codebook of a HARQ-ACK codebook.

In some implementations, a method of wireless communication performed by a network node includes transmitting, to a UE, DCI not associated with a downlink assignment; and receiving, from the UE, an ACK or NACK bit for the DCI not associated with the downlink assignment in a first sub-codebook of a HARQ-ACK codebook.

In some implementations, a non-transitory computer-readable medium storing a set of instructions for wireless communication includes one or more instructions that, when executed by one or more processors of a UE, cause the UE to: receive, from a network node, DCI not associated with a downlink assignment; and transmit, to the network node, an ACK or NACK bit for the DCI not associated with the downlink assignment in a first sub-codebook of a HARQ-ACK codebook.

In some implementations, a non-transitory computer-readable medium storing a set of instructions for wireless communication includes one or more instructions that, when executed by one or more processors of a network node, cause the network node to: transmit, to a UE, DCI not associated with a downlink assignment; and receive, from the UE, an ACK or NACK bit for the DCI not associated with the downlink assignment in a first sub-codebook of a HARQ-ACK codebook.

In some implementations, an apparatus for wireless communication includes means for receiving, from a network node, DCI not associated with a downlink assignment; and means for transmitting, to the network node, an ACK or NACK bit for the DCI not associated with the downlink assignment in a first sub-codebook of a HARQ-ACK codebook.

In some implementations, an apparatus for wireless communication includes means for transmitting, to a UE, DCI not associated with a downlink assignment; and means for receiving, from the UE, an ACK or NACK bit for the DCI not associated with the downlink assignment in a first sub-codebook of a HARQ-ACK codebook.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
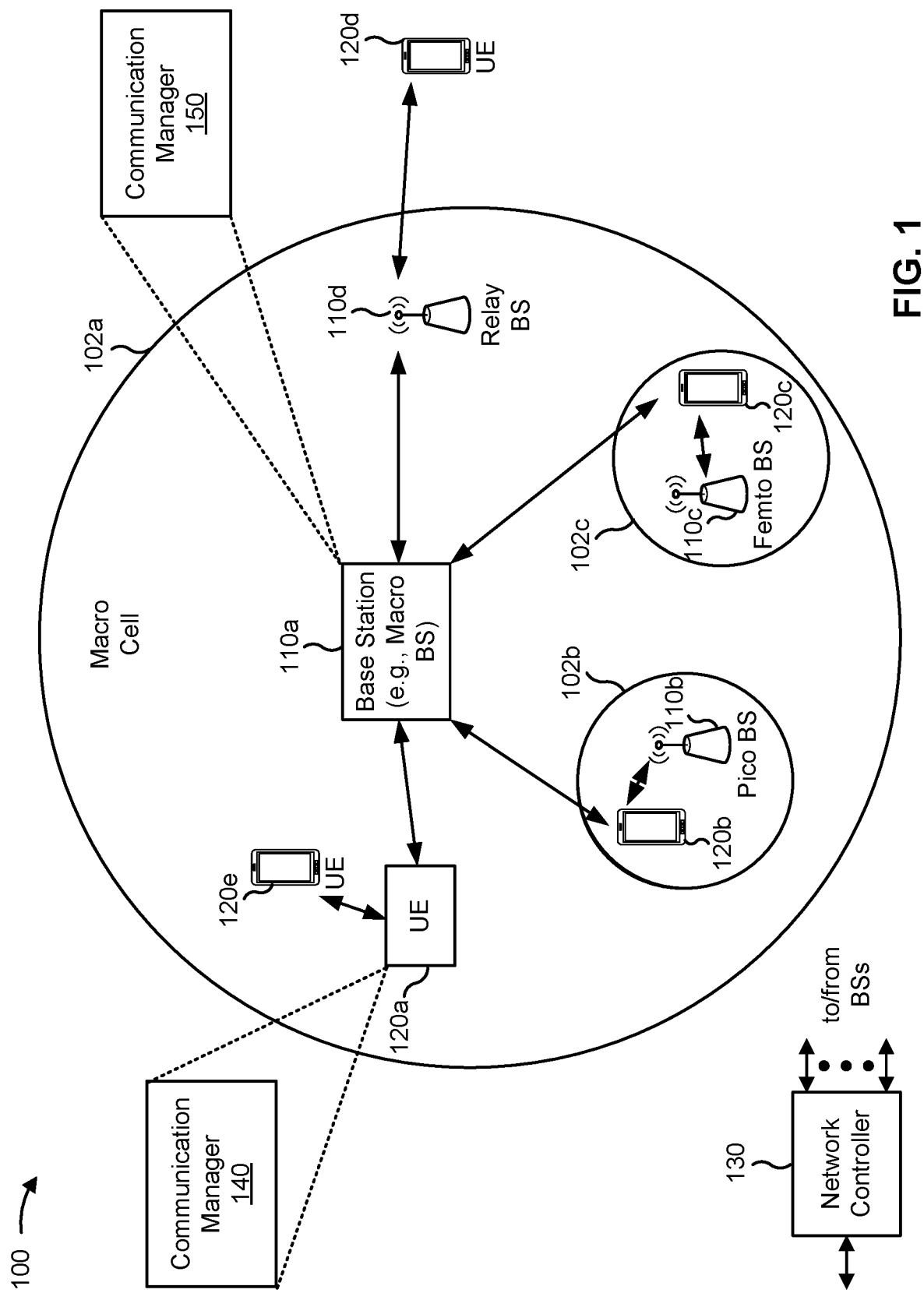
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120

(shown as a UE 120*a*, a UE 120*b*, a UE 120*c*, a ULE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some aspects, the terms "base station" (e.g., the base station 110) or "network node" may refer to an aggregated base station, a disaggregated base station, an integrated access and backhaul (IAB) node, a relay node, and/or one or more components thereof. For example, in some aspects, "base station" or "network node" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the base station 110. In some aspects, the terms "base station" or "network node" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations and/or one or more virtual base station functions. For example, in some aspects, two or more base station functions may be instantiated on a single device. In some aspects, the terms "base station" or "network node" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a network node, downlink control information (DCI) not associated with a downlink assignment; and transmit, to the network node, an acknowledgement (ACK) or negative acknowledgement (NACK) bit for the DCI not associated with the downlink assignment in a first sub-codebook of a hybrid automatic repeat request (HARQ)-ACK codebook. Additionally, or alternatively, the communication manager 140 may perform one or more other operations described herein.

In some aspects, a network node (e.g., base station 110) may include a communication manager 150. As described in more detail elsewhere herein, the communication manager 150 may transmit, to a UE, DCI not associated with a downlink assignment; and receive, from the UE, an ACK or NACK bit for the DCI not associated with the downlink assignment in a first sub-codebook of a HARQ-ACK codebook. Additionally, or alternatively, the communication manager 150 may perform one or more other operations described herein.

As indicated above, FIG. 1 is provided as an example. Other examples may differ from what is described with regard to FIG. 1.

Figure 2:
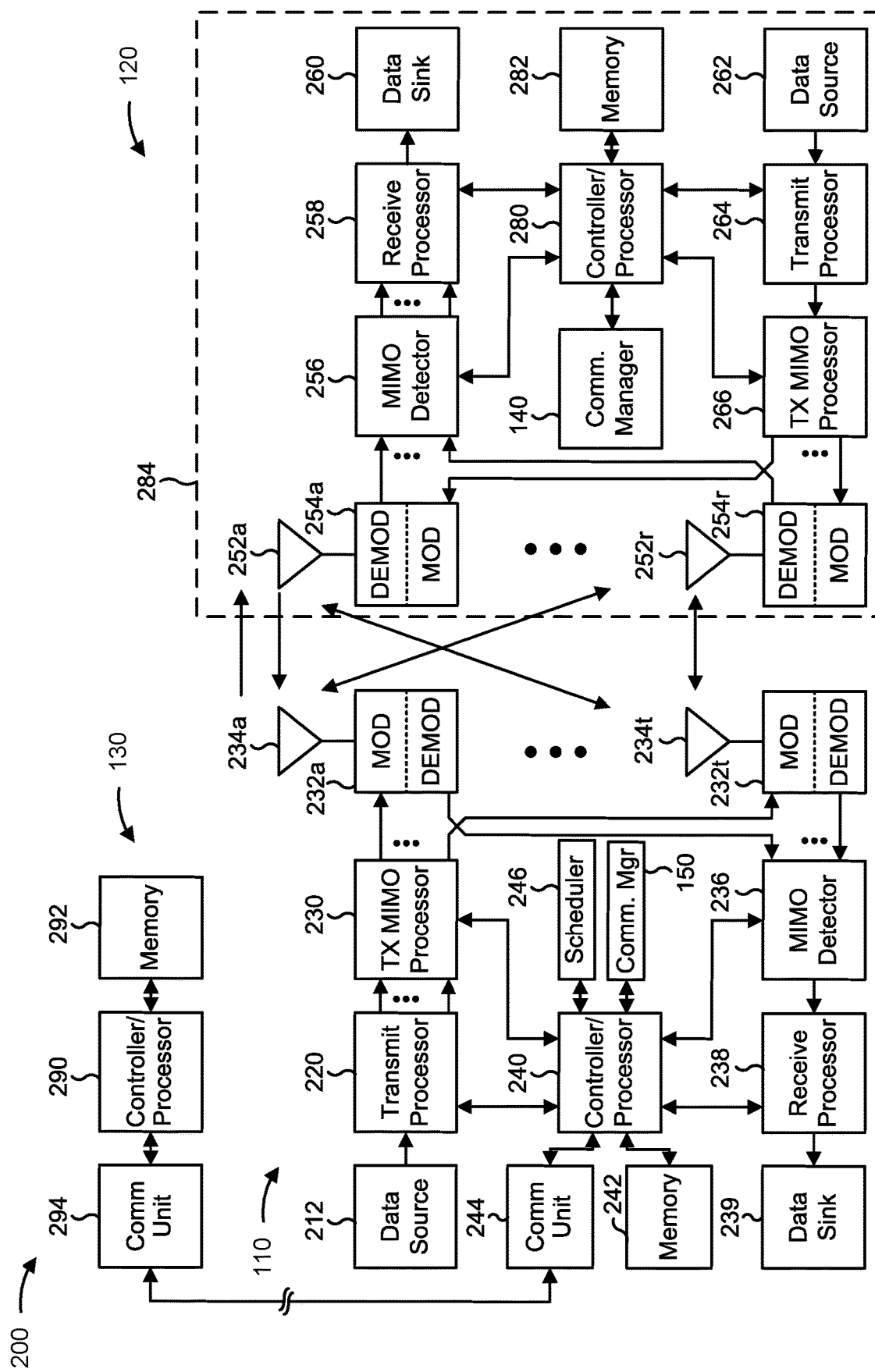
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T>1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-7).

The controller/processor 240 of the base station 110, the controller/processor 280 of the UE 120, and/or any other component(s) of FIG. 2 may perform one or more techniques associated with a HARQ-ACK codebook for DCI without downlink assignment, as described in more detail elsewhere herein. For example, the controller/processor 240 of the base station 110, the controller/processor 280 of the UE 120, and/or any other component(s) of FIG. 2 may perform or direct operations of, for example, process 400 of FIG. 4, process 500 of FIG. 5, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a network node, DCI not associated with a downlink assignment; and/or means for transmitting, to the network node, an ACK or NACK bit for the DCI not associated with the downlink assignment in a first sub-codebook of a HARQ-ACK codebook. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., base station 110) includes means for transmitting, to a UE, DCI not associated with a downlink assignment; and/or means for receiving, from the UE, an ACK or NACK bit for the DCI not associated with the downlink assignment in a first sub-codebook of a HARQ-ACK codebook. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

A UE may generate a Type-2 HARQ-ACK codebook (or a dynamic HARQ-ACK codebook) corresponding to a DCI, received from a network node (e.g., a base station), that schedules one or multiple physical downlink shared channels (PDSCHs). A counter downlink assignment index (C-DAI) and/or a total downlink assignment index (T-DAI) may be counted per DCI. When the C-DAI and/or the T-DAI is counted per DCI when generating the Type-2 HARQ-ACK codebook corresponding to the DCI that schedules the one or multiple PDSCHs, the UE may generate at least two sub-codebooks for a physical uplink control channel (PUCCH) cell group.

The at least two sub-codebooks may include a first sub-codebook and a second sub-codebook. The first sub-codebook may be for a DCI that is not configured with code block group (CBG)-based scheduling and is configured with a time domain resource allocation (TDRA) table containing rows each with a single start and length indicator value (SLIV). The first sub-codebook may be for a DCI that is not configured with CBG-based scheduling and is configured with a TDRA table containing at least one row with multiple SLIVs and schedules only a single PDSCH. The second sub-codebook may be for a DCI that is configured with a TDRA table containing at least one row with multiple SLIVs and schedules multiple PDSCHs.

A size of HARQ-ACK feedback corresponding to different DCIs may be aligned (if needed). A HARQ-ACK bit corresponding to a semi-persistent scheduling (SPS) PDSCH release, or corresponding to a secondary cell (SCell) dormancy indication without a scheduled PDSCH, may be associated with the first sub-codebook.

A DCI (e.g., DCI format 1_1/1_2) without downlink assignment may support a beam indication with a unified transmission configuration indicator (TCI). The DCI may be a beam indication DCI. A UE may transmit, based at least in part on the beam indication DCI, an ACK or NACK. The UE may transmit the ACK/NACK based at least in part on a Type-1 HARQ-ACK codebook (or semi-static HARQ-ACK codebook) or Type-2 HARQ-ACK codebook. For example, the UE may transmit the ACK based at least in part on a successful reception of the beam indication DCI. The UE may transmit the NACK based at least in part on a failed reception of the beam indication DCI.

For the Type-1 HARQ-ACK codebook, the UE may determine a location for ACK information in the Type-1 HARQ-ACK codebook based at least in part on a virtual PDSCH indicated by a TDRA field in the beam indication DCI, which may be based at least in part on a time domain allocation list configured for PDSCH. For the Type-2 HARQ-ACK codebook, the UE may determine a location for ACK information in the Type-2 HARQ-ACK codebook (similar to the SPS release). The UE may report the ACK in a PUCCH k slots after an end of a physical downlink control channel (PDCCH) reception, where k may be indicated by a PDSCH-to-HARQ feedback timing indicator field in the DCI, or k may be provided by another parameter (e.g., dl-DataToUL-ACK or dl-DataToUL-ACK-ForDCI-Format1-2-r16) when the PDSCH-to-HARQ feedback timing indicator field is not present in the DCI.

The UE may carry an ACK/NACK bit associated with the beam indication DCI in a HARQ-ACK codebook, where the beam indication DCI may be associated with the DCI without the downlink assignment that supports the beam indication with the unified TCI. However, the UE may not be configured to carry the ACK/NACK bit in a specific sub-codebook of the HARQ-ACK codebook. In other words, the sub-codebook that will carry the ACK/NACK bit associated with the beam indication DCI without the downlink assignment may not be specified to the UE, which may result in the UE being unable to report the ACK/NACK bit to the network node.

In various aspects of techniques and apparatuses described herein, a UE may receive, from a network node, DCI not associated with a downlink assignment. The DCI may indicate a TCI, where the TCI may be associated with a beam indication. The TCI may be an updated TCI as compared to a previous TCI that was indicated to the UE. In other words, the DCI may indicate an updated beam indication as compared to a previous beam indication that was indicated to the UE. The UE may transmit, to the network node, an ACK/NACK bit for the DCI not associated with the downlink assignment in a first sub-codebook of a HARQ-ACK codebook. The UE may not transmit the ACK/NACK bit in a second sub-codebook of the HARQ-ACK codebook. The UE may transmit the ACK/NACK bit in the first sub-codebook instead of the second sub-codebook to reduce a codebook size, which may reduce a signaling overhead between the UE and the network node.

Figure 3:
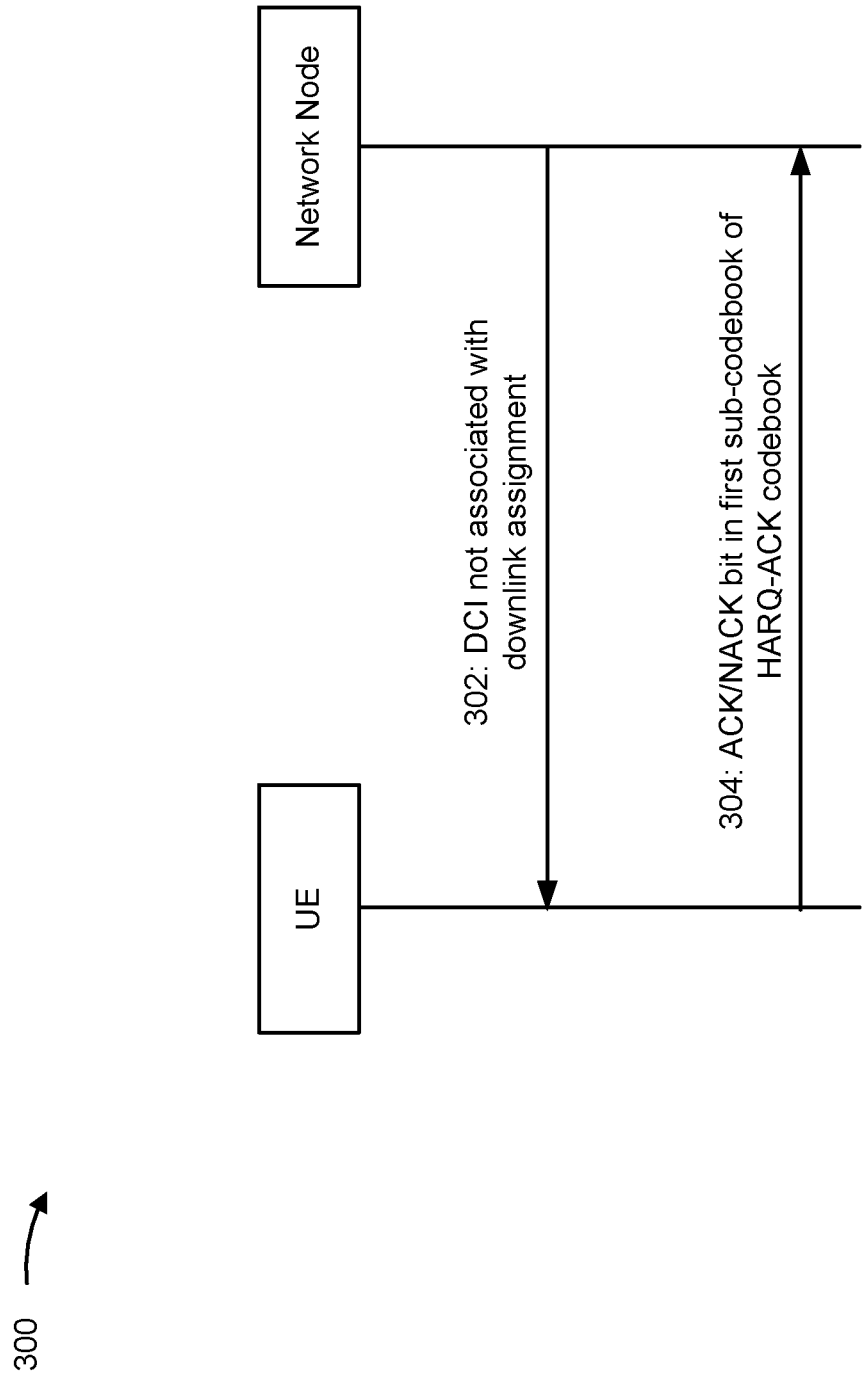
FIG. 3 is a diagram illustrating an example associated with a hybrid automatic repeat request acknowledgement (HARQ-ACK) codebook for downlink control information (DCI) without downlink assignment, in accordance with the present disclosure.

FIG. 3 is a diagram illustrating an example 300 associated with a HARQ-ACK codebook for DCI without downlink assignment, in accordance with the present disclosure. As shown in FIG. 3, example 300 includes communication between a UE (e.g., UE 120) and a network node (e.g., base station 110). In some aspects, the UE and the network node may be included in a wireless network, such as wireless network 100.

As shown by reference number 302, the UE may receive, from the network node, DCI not associated with a downlink assignment. The DCI may indicate a TCI, where the TCI may be associated with a beam indication. The DCI may be a TCI updating DCI without a downlink assignment. In other words, the DCI may indicate an updated TCI (or an updated beam) to the UE. In some aspects, the DCI may be without an associated PDSCH. In other words, the DCI may not indicate a downlink scheduling.

As shown by reference number 304, the UE may transmit, to the network node, an ACK or NACK (ACK/NACK) bit for the DCI not associated with the downlink assignment. The ACK/NACK bit may be a single bit. The UE may transmit the ACK/NACK bit in a first sub-codebook of a HARQ-ACK codebook. The HARQ-ACK codebook may be associated with the first sub-codebook and the second sub-codebook, and the UE may transmit the ACK/NACK bit in the first sub-codebook as opposed to the second sub-codebook. Further, the HARQ-ACK codebook may be a Type-2 HARQ-ACK codebook for FR2. The Type-2 HARQ-ACK codebook may be associated with a dynamic size depending on a resource allocation, as compared to a Type-1 HARQ-ACK codebook having a fixed size.

In some aspects, the first sub-codebook may be associated with providing HARQ-ACK feedback for a DCI that schedules a single PDSCH. In the first sub-codebook, a single bit of feedback may be generated per DCI, which may correspond to the ACK/NACK bit for the DCI not associated with the downlink assignment. The second sub-codebook may be associated with providing HARQ-ACK feedback for a DCI that schedules multiple PDSCHs. In the second sub-codebook, multiple bits of feedback may be generated per DCI depending on a time domain resource allocation and a time domain bundling pattern associated with the second sub-codebook. If the ACK/NACK bit for the DCI not associated with the downlink assignment were to be transmitted in the second sub-codebook, instead of in the first sub-codebook, multiple bits may be allocated to convey the ACK/NACK bit even though only a single bit is needed. The multiple bits allocated to convey the ACK/NACK bit may be due to the time domain resource allocation and the time domain bundling pattern associated with the second sub-codebook. As a result, the ACK/NACK bit for the DCI not associated with the downlink assignment may be indicated in the first sub-codebook, as opposed to the second sub-codebook, to reduce a codebook size. In other words, indicating the ACK/NACK bit in the first sub-codebook instead of the second sub-codebook helps to reduce the codebook size.

As indicated above, FIG. 3 is provided as an example. Other examples may differ from what is described with regard to FIG. 3.

Figure 4:
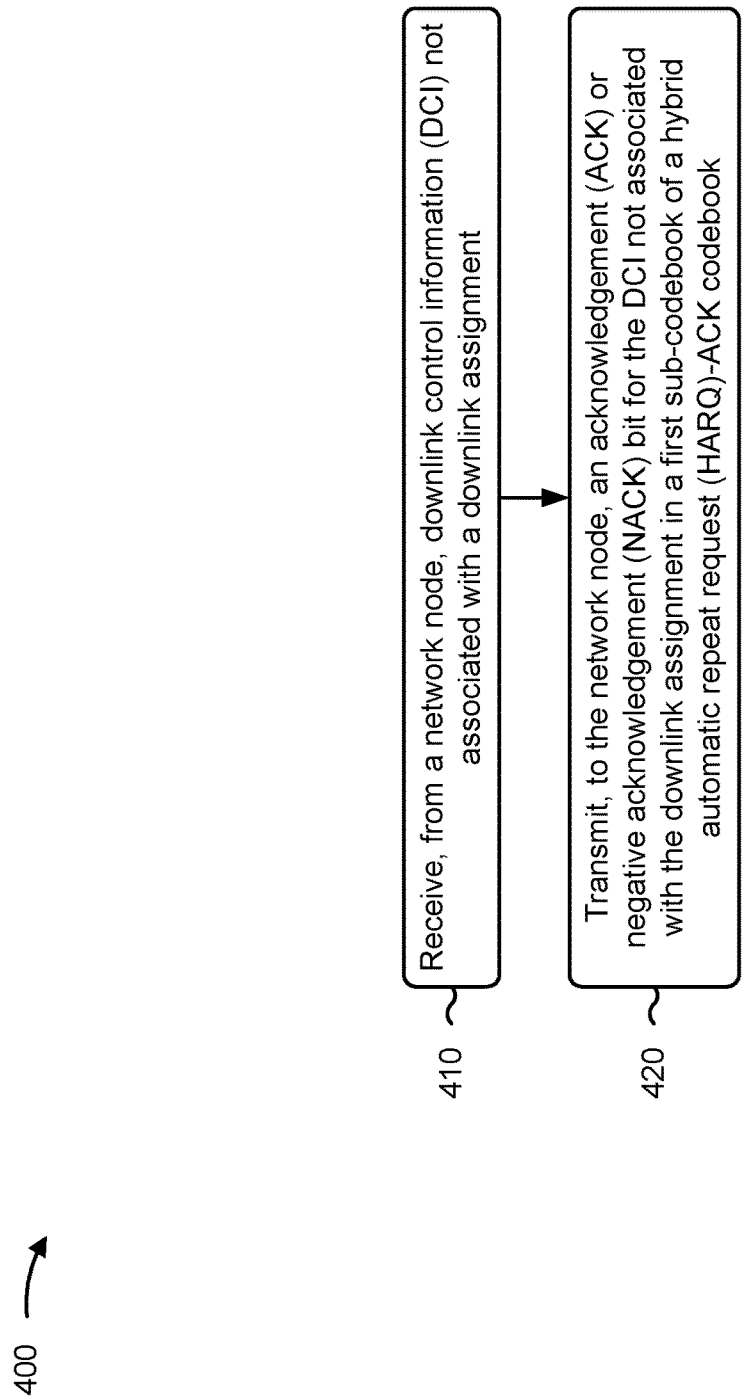
FIGS. 4-5 are diagrams illustrating example processes associated with a HARQ-ACK codebook for DCI without downlink assignment, in accordance with the present disclosure.

FIG. 4 is a diagram illustrating an example process 400 performed, for example, by a UE, in accordance with the present disclosure. Example process 400 is an example where the UE (e.g., UE 120) performs operations associated with a HARQ-ACK codebook for DCI without downlink assignment.

As shown in FIG. 4, in some aspects, process 400 may include receiving, from a network node, DCI not associated with a downlink assignment (block 410). For example, the UE (e.g., using reception component 602, depicted in FIG. 6) may receive, from a network node, DCI not associated with a downlink assignment, as described above.

As further shown in FIG. 4, in some aspects, process 400 may include transmitting, to the network node, an ACK or NACK bit for the DCI not associated with the downlink assignment in a first sub-codebook of a HARQ-ACK codebook (block 420). For example, the UE (e.g., using transmission component 604, depicted in FIG. 6) may transmit, to the network node, an ACK or NACK bit for the DCI not associated with the downlink assignment in a first sub-codebook of a HARQ-ACK codebook, as described above.

Process 400 may include additional aspects, such as any single aspect or any combination of aspects described below and/or in connection with one or more other processes described elsewhere herein.

In a first aspect, the HARQ-ACK codebook is associated with the first sub-codebook and a second sub-codebook, wherein the first sub-codebook is associated with a single feedback bit per DCI, and the second sub-codebook is associated with multiple feedback bits per DCI based at least in part on a time domain resource allocation and a time domain bundling pattern.

In a second aspect, alone or in combination with the first aspect, the DCI not associated with the downlink assignment indicates a TCI, and the TCI is associated with a beam indication.

In a third aspect, alone or in combination with one or more of the first and second aspects, the DCI not associated with the downlink assignment is a DCI without an associated PDSCH.

In a fourth aspect, alone or in combination with one or more of the first through third aspects, the HARQ-ACK codebook is a Type-2 HARQ-ACK codebook for a Frequency Range 2.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
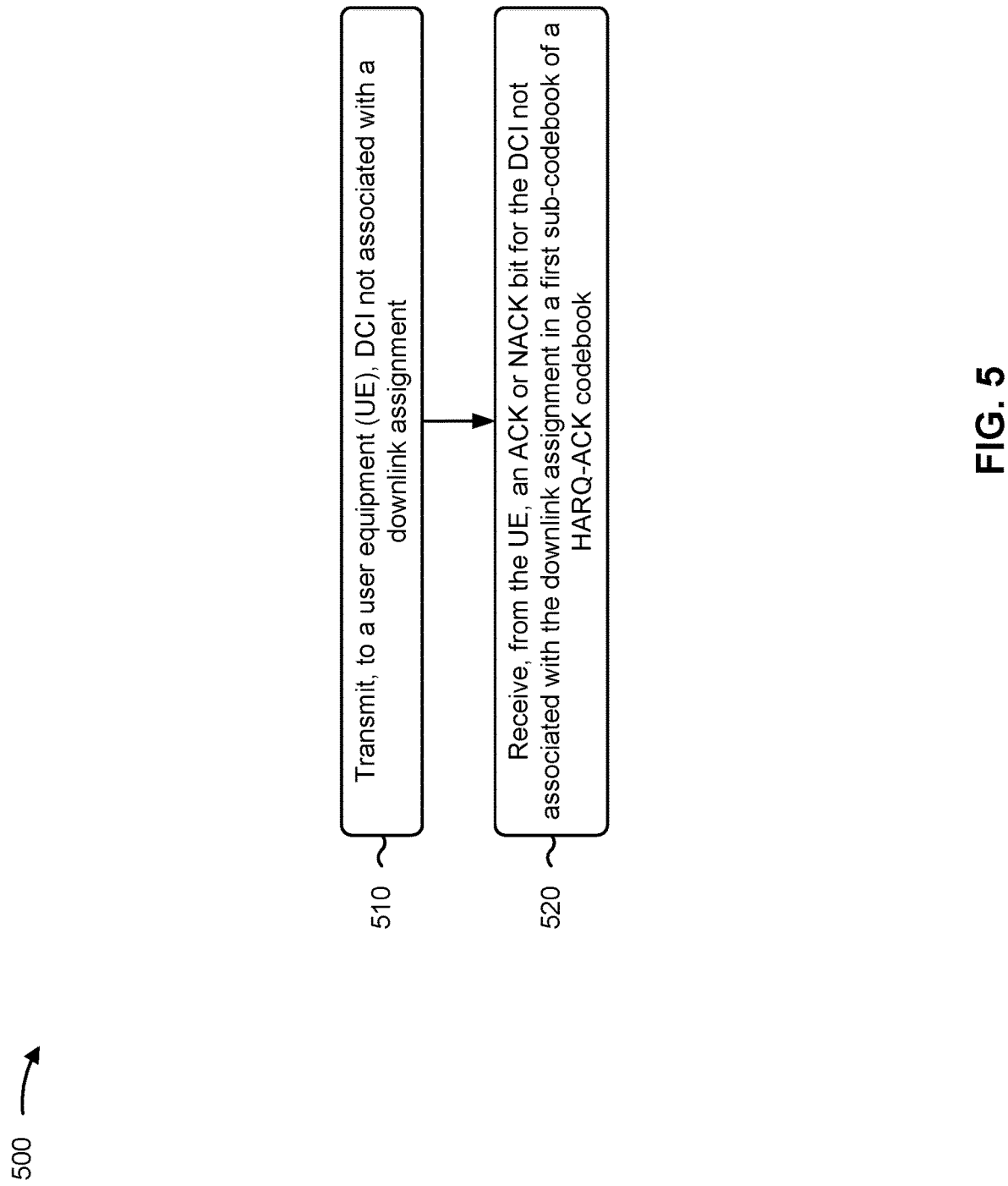

FIG. 5 is a diagram illustrating an example process 500 performed, for example, by a network node, in accordance with the present disclosure. Example process 500 is an example where the network node (e.g., base station 110) performs operations associated with a HARQ-ACK codebook for DCI without downlink assignment.

As shown in FIG. 5, in some aspects, process 500 may include transmitting, to a UE, DCI not associated with a downlink assignment (block 510). For example, the network node (e.g., using transmission component 704, depicted in FIG. 7) may transmit, to a UE, DCI not associated with a downlink assignment, as described above.

As further shown in FIG. 5, in some aspects, process 500 may include receiving, from the UE, an ACK or NACK bit for the DCI not associated with the downlink assignment in a first sub-codebook of a HARQ-ACK codebook (block 520). For example, the network node (e.g., using reception component 702, depicted in FIG. 7) may receive, from the UE, an ACK or NACK bit for the DCI not associated with the downlink assignment in a first sub-codebook of a HARQ-ACK codebook, as described above.

Process 500 may include additional aspects, such as any single aspect or any combination of aspects described below and/or in connection with one or more other processes described elsewhere herein.

In a first aspect, the HARQ-ACK codebook is associated with the first sub-codebook and a second sub-codebook, wherein the first sub-codebook is associated with a single feedback bit per DCI, and the second sub-codebook is associated with multiple feedback bits per DCI based at least in part on a time domain resource allocation and a time domain bundling pattern.

In a second aspect, alone or in combination with the first aspect, the DCI not associated with the downlink assignment indicates a TCI, and the TCI is associated with a beam indication.

In a third aspect, alone or in combination with one or more of the first and second aspects, the DCI not associated with the downlink assignment is a DCI without an associated PDSCH.

In a fourth aspect, alone or in combination with one or more of the first through third aspects, the HARQ-ACK codebook is a Type-2 HARQ-ACK codebook for a Frequency Range 2.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
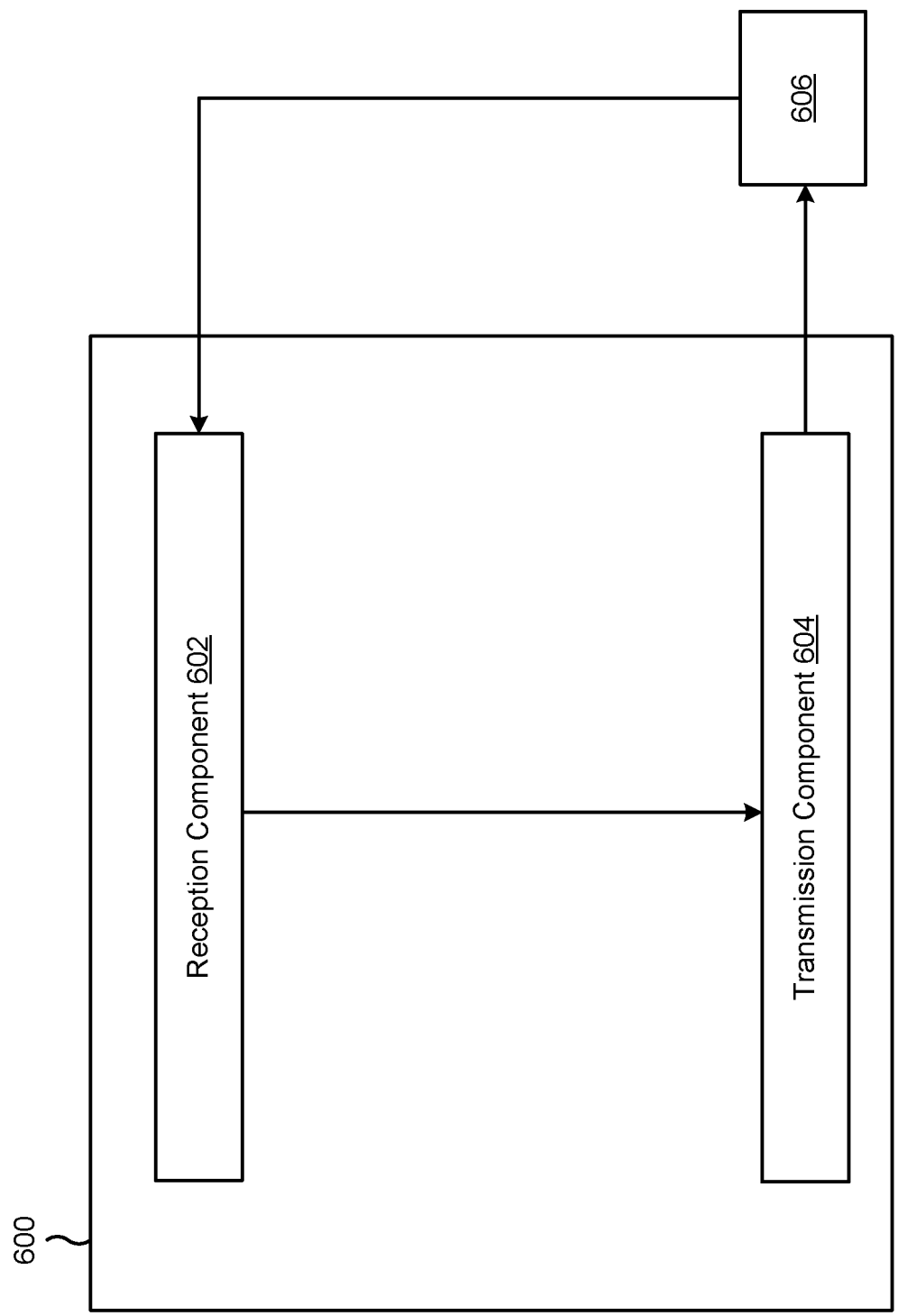
FIGS. 6-7 are diagrams of example apparatuses for wireless communication, in accordance with the present disclosure.

FIG. 6 is a diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604.

In some aspects, the apparatus 600 may be configured to perform one or more operations described herein in connection with FIG. 3. Additionally, or alternatively, the apparatus 600 may be configured to perform one or more processes described herein, such as process 400 of FIG. 4. In some aspects, the apparatus 600 and/or one or more components shown in FIG. 6 may include one or more components of the UE described in connection with FIG. 2. Additionally, or alternatively, one or more components shown in FIG. 6 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 600. In some aspects, the reception component 602 may include one or more antennas, a modem, a demodulator, a MIMO detector, a receive processor, a controller/processor, a memory, or a combination thereof, of the UE described in connection with FIG. 2.

The transmission component 604 may transmit communications, such as reference signals, control information, data communications, or a combination thereof, to the apparatus 606. In some aspects, one or more other components of the apparatus 600 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modem, a modulator, a transmit MIMO processor, a transmit processor, a controller/processor, a memory, or a combination thereof, of the UE described in connection with FIG. 2. In some aspects, the transmission component 604 may be co-located with the reception component 602 in a transceiver.

The reception component 602 may receive, from a network node, DCI not associated with a downlink assignment. The transmission component 604 may transmit, to the network node, an ACK or NACK bit for the DCI not associated with the downlink assignment in a first sub-codebook of a HARQ-ACK codebook.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
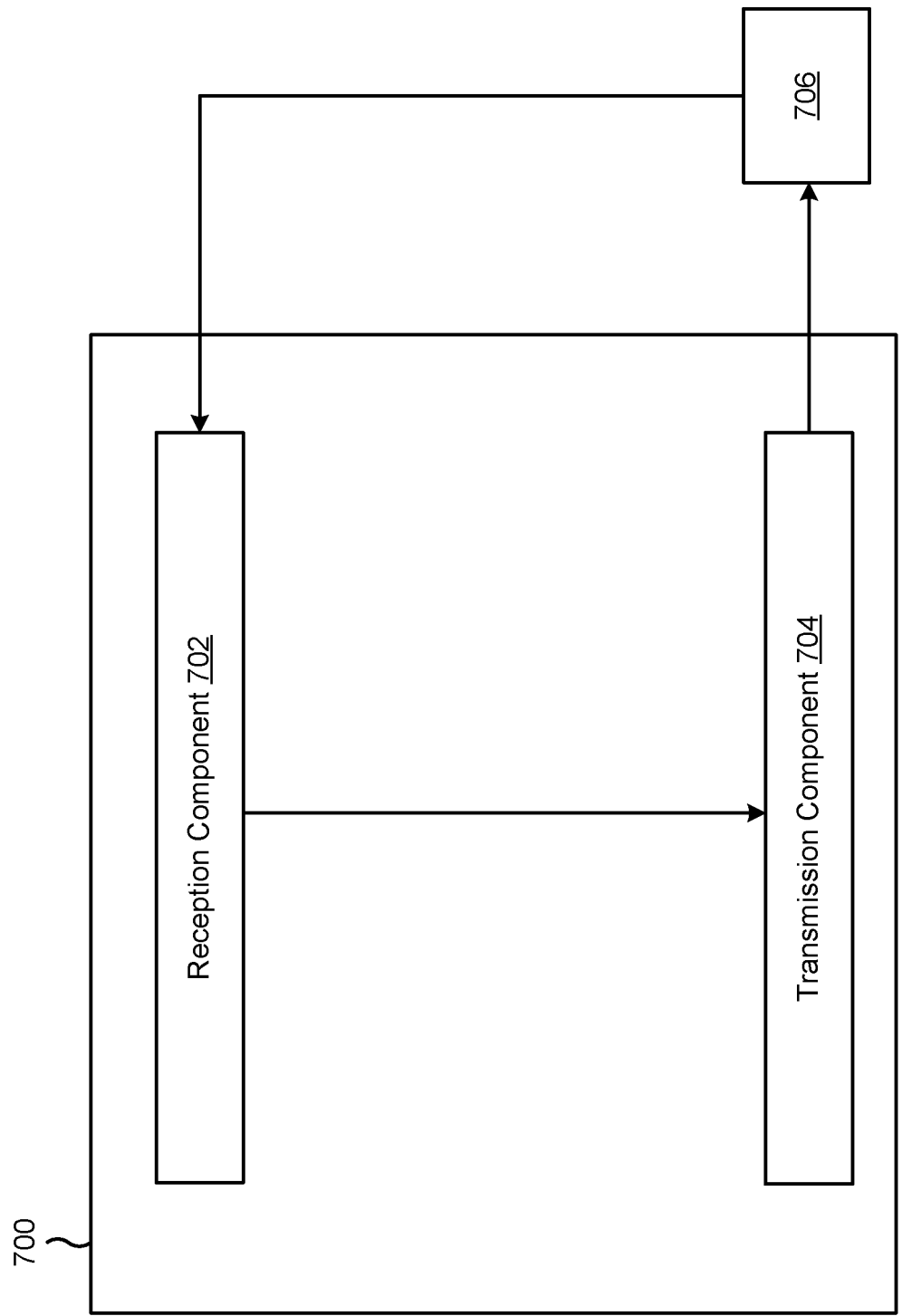

FIG. 7 is a diagram of an example apparatus 700 for wireless communication. The apparatus 700 may be a network node, or a network node may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704.

In some aspects, the apparatus 700 may be configured to perform one or more operations described herein in connection with FIG. 3. Additionally, or alternatively, the apparatus 700 may be configured to perform one or more processes described herein, such as process 500 of FIG. 5. In some aspects, the apparatus 700 and/or one or more components shown in FIG. 7 may include one or more components of the base station described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the base station described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the base station described in connection with FIG. 2. In some aspects, the transmission component 704 may be co-located with the reception component 702 in a transceiver.

The transmission component 704 may transmit, to a UE, DCI not associated with a downlink assignment. The reception component 702 may receive, from the UE, an ACK or NACK bit for the DCI not associated with the downlink assignment in a first sub-codebook of a HARQ-ACK codebook.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
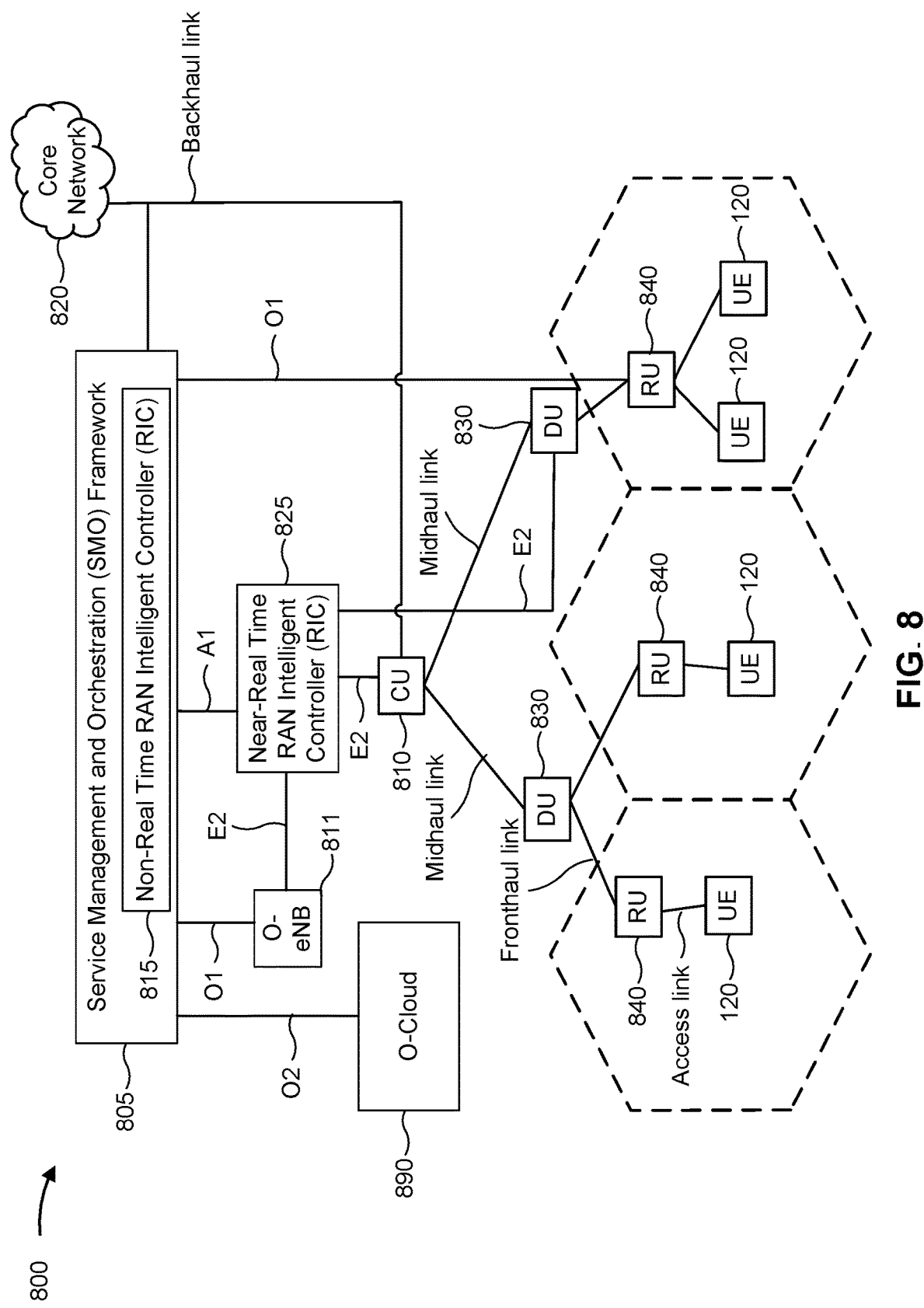
FIG. 8 is a diagram illustrating an example of a disaggregated base station architecture, in accordance with the present disclosure.

FIG. 8 is a diagram illustrating an example 800 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 8 may include one or more CUs 810 that can communicate directly with a core network 820 via a backhaul link, or indirectly with the core network 820 through one or more disaggregated base station units (such as a Near-RT RIC 825 via an E2 link, or a Non-RT RIC 815 associated with a Service Management and Orchestration (SMO) Framework 805, or both). A CU 810 may communicate with one or more DUs 830 via respective midhaul links, such as an F1 interface. The DUs 830 may communicate with one or more RUs 840 via respective fronthaul links. The RUs 840 may communicate with respective UEs 120 via one or more radio frequency (RF) access links. In some implementations, the UE 120 may be simultaneously served by multiple RUs 840.

Each of the units (e.g., the CUs 810, the DUs 830, the RUs 840), as well as the Near-RT RICs 825, the Non-RT RICs 815, and the SMO Framework 805, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 810 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 810. The CU 810 may be configured to handle user plane functionality (e.g., Central Unit—User Plane (CU-UP)), control plane functionality (e.g., Central Unit—Control Plane (CU-CP)), or a combination thereof. In some implementations, the CU 810 can be logically split into one or more CU-UP units and one or more CU-CP units. The CU-UP unit can communicate bidirectionally with the CU-CP unit via an interface, such as the E1 interface when implemented in an O-RAN configuration. The CU 810 can be implemented to communicate with the DU 830, as necessary, for network control and signaling.

The DU 830 may correspond to a logical unit that includes one or more base station functions to control the operation of one or more RUs 840. In some aspects, the DU 830 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 830 may further host one or more low-PHY layers. Each layer (or module) can be implemented with an interface configured to communicate signals with other layers (and modules) hosted by the DU 830, or with the control functions hosted by the CU 810.

Lower-layer functionality can be implemented by one or more RUs 840. In some deployments, an RU 840, controlled by a DU 830, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 840 can be implemented to handle over the air (OTA) communication with one or more UEs 120. In some implementations, real-time and non-real-time aspects of control and user plane communication with the RU(s) 840 can be controlled by the corresponding DU 830. In some scenarios, this configuration can enable the DU(s) 830 and the CU 810 to be implemented in a cloud-based RAN architecture, such as a vRAN architecture.

The SMO Framework 805 may be configured to support RAN deployment and provisioning of non-virtualized and virtualized network elements. For non-virtualized network elements, the SMO Framework 805 may be configured to support the deployment of dedicated physical resources for RAN coverage requirements which may be managed via an operations and maintenance interface (such as an O1 interface). For virtualized network elements, the SMO Framework 805 may be configured to interact with a cloud computing platform (such as an open cloud (O-Cloud) 890) to perform network element life cycle management (such as to instantiate virtualized network elements) via a cloud computing platform interface (such as an O2 interface). Such virtualized network elements can include, but are not limited to, CUs 810, DUs 830, RUs 840 and Near-RT RICs 825. In some implementations, the SMO Framework 805 can communicate with a hardware aspect of a 4G RAN, such as an open eNB (O-eNB) 811, via an O1 interface. Additionally, in some implementations, the SMO Framework 805 can communicate directly with one or more RUs 840 via an O1 interface. The SMO Framework 805 also may include a Non-RT RIC 815 configured to support functionality of the SMO Framework 805.

The Non-RT RIC 815 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 825.

The Non-RT RIC 815 may be coupled to or communicate with (such as via an A1 interface) the Near-RT RIC 825. The Near-RT RIC 825 may be configured to include a logical function that enables near-real-time control and optimization of RAN elements and resources via data collection and actions over an interface (such as via an E2 interface) connecting one or more CUs 810, one or more DUs 830, or both, as well as an O-eNB, with the Near-RT RIC 825.

In some implementations, to generate AI/ML models to be deployed in the Near-RT RIC 825, the Non-RT RIC 815 may receive parameters or external enrichment information from external servers. Such information may be utilized by the Near-RT RIC 825 and may be received at the SMO Framework 805 or the Non-RT RIC 815 from non-network data sources or from network functions. In some examples, the Non-RT RIC 815 or the Near-RT RIC 825 may be configured to tune RAN behavior or performance. For example, the Non-RT RIC 815 may monitor long-term trends and patterns for performance and employ AI/ML models to perform corrective actions through the SMO Framework 805 (such as reconfiguration via O1) or via creation of RAN management policies (such as A1 policies).

As indicated above, FIG. 8 is provided as an example. Other examples may differ from what is described with regard to FIG. 8.

The following provides an overview of some Aspects of the present disclosure:

Aspect 1: A method of wireless communication performed by a user equipment (UE), comprising: receiving, from a network node, downlink control information (DCI) not associated with a downlink assignment; and transmitting, to the network node, an acknowledgement (ACK) or negative acknowledgement (NACK) bit for the DCI not associated with the downlink assignment in a first sub-codebook of a hybrid automatic repeat request (HARQ)-ACK codebook.

Aspect 2: The method of Aspect 1, wherein the HARQ-ACK codebook is associated with the first sub-codebook and a second sub-codebook, wherein the first sub-codebook is associated with a single feedback bit per DCI, and wherein the second sub-codebook is associated with multiple feedback bits per DCI based at least in part on a time domain resource allocation and a time domain bundling pattern.

Aspect 3: The method of any of Aspects 1 through 2, wherein the DCI not associated with the downlink assignment indicates a transmission configuration indicator (TCI), and wherein the TCI is associated with a beam indication.

Aspect 4: The method of any of Aspects 1 through 3, wherein the DCI not associated with the downlink assignment is a DCI without an associated physical downlink shared channel.

Aspect 5: The method of any of Aspects 1 through 4, wherein the HARQ-ACK codebook is a Type-2 HARQ-ACK codebook for a Frequency Range 2.

Aspect 6: A method of wireless communication performed by a network node, comprising: transmitting, to a user equipment (UE), downlink control information (DCI) not associated with a downlink assignment; and receiving, from the UE, an acknowledgement (ACK) or negative acknowledgement (NACK) bit for the DCI not associated with the downlink assignment in a first sub-codebook of a hybrid automatic repeat request (HARQ)-ACK codebook.

Aspect 7: The method of Aspect 6, wherein the HARQ-ACK codebook is associated with the first sub-codebook and a second sub-codebook, wherein the first sub-codebook is associated with a single feedback bit per DCI, and wherein the second sub-codebook is associated with multiple feedback bits per DCI based at least in part on a time domain resource allocation and a time domain bundling pattern.

Aspect 8: The method of any of Aspects 6 through 7, wherein the DCI not associated with the downlink assignment indicates a transmission configuration indicator (TCI), and wherein the TCI is associated with a beam indication.

Aspect 9: The method of any of Aspects 6 through 8, wherein the DCI not associated with the downlink assignment is a DCI without an associated physical downlink shared channel.

Aspect 10: The method of any of Aspects 6 through 9, wherein the HARQ-ACK codebook is a Type-2 HARQ-ACK codebook for a Frequency Range 2.

Aspect 11: An apparatus for wireless communication at a device, comprising a processor; memory coupled with the processor; and instructions stored in the memory and executable by the processor to cause the apparatus to perform the method of one or more of Aspects 1-5.

Aspect 12: A device for wireless communication, comprising a memory and one or more processors coupled to the memory, the one or more processors configured to perform the method of one or more of Aspects 1-5.

Aspect 13: An apparatus for wireless communication, comprising at least one means for performing the method of one or more of Aspects 1-5.

Aspect 14: A non-transitory computer-readable medium storing code for wireless communication, the code comprising instructions executable by a processor to perform the method of one or more of Aspects 1-5.

Aspect 15: A non-transitory computer-readable medium storing a set of instructions for wireless communication, the set of instructions comprising one or more instructions that, when executed by one or more processors of a device, cause the device to perform the method of one or more of Aspects 1-5.

Aspect 16: An apparatus for wireless communication at a device, comprising a processor; memory coupled with the processor; and instructions stored in the memory and executable by the processor to cause the apparatus to perform the method of one or more of Aspects 6-10.

Aspect 17: A device for wireless communication, comprising a memory and one or more processors coupled to the memory, the one or more processors configured to perform the method of one or more of Aspects 6-10.

Aspect 18: An apparatus for wireless communication, comprising at least one means for performing the method of one or more of Aspects 6-10.

Aspect 19: A non-transitory computer-readable medium storing code for wireless communication, the code comprising instructions executable by a processor to perform the method of one or more of Aspects 6-10.

Aspect 20: A non-transitory computer-readable medium storing a set of instructions for wireless communication, the set of instructions comprising one or more instructions that, when executed by one or more processors of a device, cause the device to perform the method of one or more of Aspects 6-10.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a processing system that includes one or more processors and one or more code-storing memories coupling with the one or more processors, the processing system configured to cause the UE to:
receive, from a network node, downlink control information (DCI) without an associated physical downlink shared channel (PDSCH); and
transmit, to the network node, an acknowledgement (ACK) or negative acknowledgement (NACK) bit in a first sub-codebook of a hybrid automatic repeat request (HARQ)-ACK codebook,
wherein the first sub-codebook is associated with providing HARQ-ACK feedback for a DCI that schedules a single PDSCH or a DCI that is not associated with a downlink assignment, and
wherein the processing system is configured to transmit the ACK/NACK bit in the first sub-codebook for the DCI without the associated PDSCH.

2. The UE of claim 1, wherein the HARQ-ACK codebook is associated with the first sub-codebook and a second sub-codebook.

3. The UE of claim 2, wherein the first sub-codebook is associated with a single feedback bit per DCI.

4. The UE of claim 2, wherein the second sub-codebook is associated with multiple feedback bits per DCI based at least in part on a time domain resource allocation and a time domain bundling pattern.

5. The UE of claim 1, wherein the DCI without the associated PDSCH indicates a transmission configuration indicator (TCI).

6. The UE of claim 5, wherein the TCI is associated with a beam indication.

7. The UE of claim 1, wherein the HARQ-ACK codebook is a Type-2 HARQ-ACK codebook for a Frequency Range 2.

8. The UE of claim 7, wherein the Type-2 HARQ-ACK codebook is associated with a dynamic size depending on a resource allocation.

9. A network node for wireless communication, comprising:
a processing system that includes one or more processors and one or more code-storing memories coupling with the one or more processors, the processing system configured to cause the network node to:
transmit, to a user equipment (UE), downlink control information (DCI) without an associated physical downlink shared channel (PDSCH); and
receive, from the UE, an acknowledgement (ACK) or negative acknowledgement (NACK) bit in a first sub-codebook of a hybrid automatic repeat request (HARQ)-ACK codebook,
wherein the first sub-codebook is associated with HARQ-ACK feedback for a DCI that schedules a single PDSCH, and
wherein the processing system is configured to receive the ACK/NACK bit in the first sub-codebook for the DCI without the associated PDSCH.

10. The network node of claim 9, wherein the HARQ-ACK codebook is associated with the first sub-codebook and a second sub-codebook.

11. The network node of claim 10, wherein the first sub-codebook is associated with a single feedback bit per DCI.

12. The network node of claim 10, wherein the second sub-codebook is associated with multiple feedback bits per DCI based at least in part on a time domain resource allocation and a time domain bundling pattern.

13. The network node of claim 9, wherein the DCI without the associated PDSCH indicates a transmission configuration indicator (TCI).

14. The network node of claim 13, wherein the TCI is associated with a beam indication.

15. The network node of claim 9, wherein the HARQ-ACK codebook is a Type-2 HARQ-ACK codebook for a Frequency Range 2.

16. The network node of claim 15, wherein the Type-2 HARQ-ACK codebook is associated with a dynamic size depending on a resource allocation.

17. A method of wireless communication performed by a user equipment (UE), comprising:
receiving, from a network node, downlink control information (DCI) without an associated physical downlink shared channel (PDSCH); and
transmitting, to the network node, an acknowledgement (ACK) or negative acknowledgement (NACK) bit in a first sub-codebook of a hybrid automatic repeat request (HARQ)-ACK codebook,
wherein the first sub-codebook is associated with providing HARQ-ACK feedback for a DCI that schedules a single PDSCH, and
wherein the ACK/NACK bit is transmitted in the first sub-codebook for the DCI without the associated PDSCH.

18. The method of claim 17, wherein the HARQ-ACK codebook is associated with the first sub-codebook and a second sub-codebook.

19. The method of claim 18, wherein the first sub-codebook is associated with a single feedback bit per DCI.

20. The method of claim 18, wherein the second sub-codebook is associated with multiple feedback bits per DCI based at least in part on a time domain resource allocation and a time domain bundling pattern.

21. The method of claim 17, wherein the DCI without the associated PDSCH indicates a transmission configuration indicator (TCI), and wherein the TCI is associated with a beam indication.

22. The method of claim 17, wherein the HARQ-ACK codebook is a Type-2 HARQ-ACK codebook for a Frequency Range 2.

23. The method of claim 22, wherein the Type-2 HARQ-ACK codebook is associated with a dynamic size depending on a resource allocation.

24. A method of wireless communication performed by a network node, comprising:
transmitting, to a user equipment (UE), downlink control information (DCI) without an associated physical downlink shared channel (PDSCH); and
receiving, from the UE, an acknowledgement (ACK) or negative acknowledgement (NACK) bit in a first sub-codebook of a hybrid automatic repeat request (HARQ)-ACK codebook,
wherein the first sub-codebook is associated with HARQ-ACK feedback for a DCI that schedules a single PDSCH, and
wherein the ACK/NACK bit is received in the first sub-codebook for the DCI without the associated PDSCH.

25. The method of claim 24, wherein the HARQ-ACK codebook is associated with the first sub-codebook and a second sub-codebook.

26. The method of claim 25, wherein the first sub-codebook is associated with a single feedback bit per DCI.

27. The method of claim 25, wherein the second sub-codebook is associated with multiple feedback bits per DCI based at least in part on a time domain resource allocation and a time domain bundling pattern.

28. The method of claim 24, wherein the DCI without the associated PDSCH indicates a transmission configuration indicator (TCI), and wherein the TCI is associated with a beam indication.

29. The method of claim 24, wherein the HARQ-ACK codebook is a Type-2 HARQ-ACK codebook for a Frequency Range 2.

30. The method of claim 29, wherein the Type-2 HARQ-ACK codebook is associated with a dynamic size depending on a resource allocation.

* * * * *